3,422,447
SEISMIC WAVE GENERATOR WITH VENTING VALVE
Lauren G. Kilmer, Tulsa, Okla., assignor, by mesne assignments, to Sinclair Research, Inc., New York, N.Y., a corporation of Delaware
Continuation-in-part of application Ser. No. 314,230, Oct. 7, 1963. This application May 17, 1966, Ser. No. 550,836
The portion of the term of the patent subsequent to Apr. 18, 1984, has been disclaimed
U.S. Cl. 181—.5    7 Claims
Int. Cl. G10k 11/00; G01v 1/00; G01v 1/02

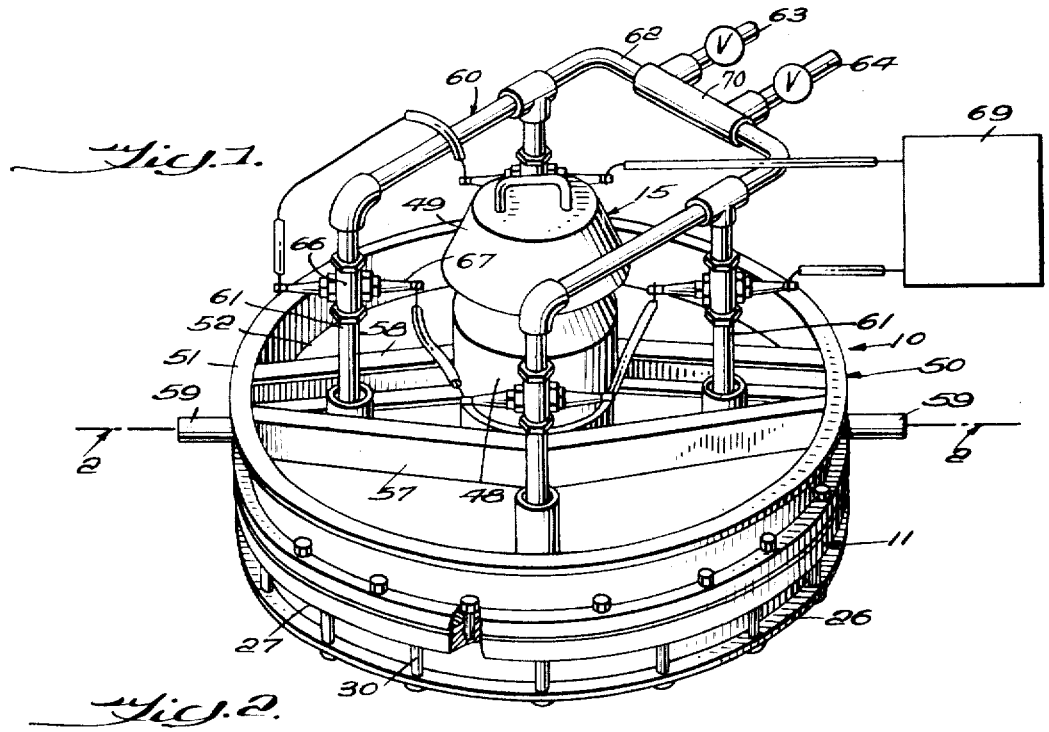
Fig. 1.
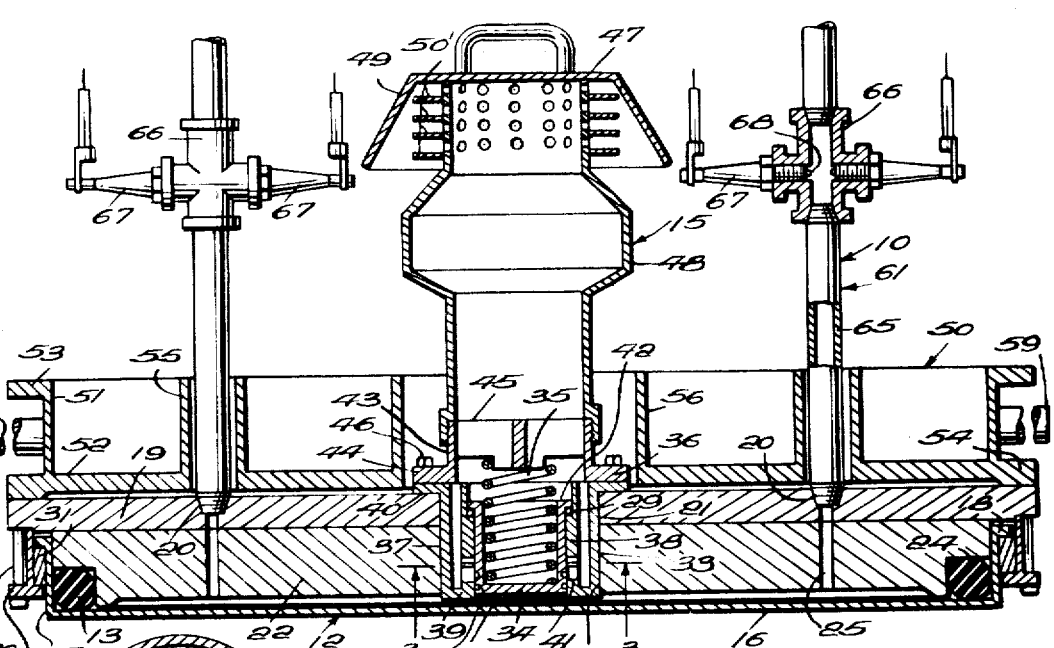
Fig. 2.
Fig. 3.
INVENTOR.
LAUREN G. KILMER,
BY
McLean, Morton & Boustead
ATTORNEYS

United States Patent Office 3,422,447
Patented Jan. 14, 1969

ABSTRACT OF THE DISCLOSURE

A seismic wave generator including a combustion chamber having a rigid bottom and rigid top resiliently fastened together to permit limited vertical movement of the top relative to the bottom, and having a spring biased sliding exhaust valve actuated substantially simultaneously with the occurrence of relative movement between the bottom and the top to rapidly vent the pressure within the chamber.

---

This application is a continuation-in-part of Kilmer application Ser. No. 314,230, filed Oct. 7, 1963 now U.S. Patent No. 3,314,497.

My invention pertains to the seismic exploration of geological formations and, more particularly, a valve device for rapidly exhausting a telescopic explosion chamber used to impart compressive impulses at the surface of the earth.

A widely used method of geological exploration includes the production of a seismic wave which is reflected or refracted by a particular sub-surface formation. Such reflections and refractions are recorded by seismograms so produced, an indication may be had of the underground formation. Customarily, the seismic wave is usually initiated by drilling a hole about a hundred feet below the surface of the earth and detonating an explosive charge within the earth.

As described in my co-pending application Ser. No. 314,230, filed Oct. 7, 1963, now U.S. Patent No. 3,314,497, a gas explosion, confined in an expansible chamber acting at the earth-air interface against a large mass positioned above such gas explosion, can be utilized to impart a compressive pulse to the surface of the earth beneath the gas explosion, thereby initiating a seismic wave. If the explosion is confined in a device having a rigid top (carrying the weight of the large mass) and rigid bottom with vertically extensible sidewalls, the seismic wave generated is useful for seismic prospecting by refraction and reflection techniques, since the impulse imparted to the surface of the earth has a high energy content and can be made of extremely short duration.

I have found that the useful energy, which is imparted to the earth in such a device, is substantially derived from the heat of the reaction, i.e., explosion, in combination with the shock of detonation, and therefore occurs at the moment of the explosion before there is any significant upward movement of the top of the device, i.e., the imposed mass, occurring as a result of the explosion. It is therefore desirable, in accordance with my present invention, to vent the chamber in which the explosion is confined, the moment vertical extension of the sidewalls occurs. Such rapid venting serves to decrease the time between "shots," permits substantial exhaustion of the exploder after each "shot," and emphasizes the desired wave produced by the heat of reaction.

It is accordingly an object of the present invention to provide a device for rapidly venting the explosion chamber of a seismic wave generator which preferably, is formed by a rigid top and rigid bottom telescoping within one another to form the chamber and has a resilient sealing means connecting the top and bottom.

In accordance with these general objects, the exploder of my invention includes an explosion chamber formed with a rigid top and a rigid bottom adapted to be coupled to the surface of the earth, which chamber is rapidly vented following detonation of a combustible charge therein. The exhaust or venting means for the chamber can preferably be, for example, a valve arrangement designed to release the gases formed by the explosion simultaneously with the occurrence of relative movement between the top and bottom of the exploder. A spring biased, piston-like valve element arranged in an opening in the rigid top forming the chamber is quite suitable for this purpose.

The explosion which initiates the seismic wave in accordance with my invention can be produced by detonating in the chamber an explosive, combustible charge such as oxygen and any fuel gas, e.g., hydrocarbon or petroleum-derived, which may be detonated with a sufficient heat of reaction to produce a compressional wave for initiating the seismic wave. The fuel gas is usually mixed with oxygen in approximately stoichiometric amounts although a slight excess of oxygen may be preferred. Mol ratios of from about one-half mol excess fuel to one-half mol excess oxygen are preferred.

For a more complete understanding of the practical application of my invention reference is made to the appended drawings in which:

FIGURE 1 is an isometric view of a gas exploder constructed in accordance with my present invention;

FIGURE 2 is a vertical section taken at line 2—2 in FIGURE 1; and

FIGURE 3 is a plan section of the valve of the gas exploder taken at line 3—3 in FIGURE 2.

Referring more particularly to FIGURES 1 and 2, the reference number 10 designates a gas exploder constructed in accordance with my present invention. Gas exploder 10 basically includes a top 11, a bottom 12, a sealing ring 13, a valve 14 and an exhaust stack 15. Bottom 12 includes a circular steel plate 16 which at its rim is provided with an integral, upstanding, cylindrical flange 17 which at its upper end carries an integral, outwardly-extending, short, annular flange 18.

Top 11 includes a thick, annular steel plate 19 having an outside diameter slightly larger than the outside diameter of flange 18 and further provided with a central opening 21 and four small, tapped, vertical openings 20 disposed at 90° intervals about plate 19 approximately midway between central opening 21 and its rim. Plate 19 carries a depending coaxially positioned, generally annular, iron casting 22 which is welded to the underside of plate 19. Casting 22 is approximately of the same height as flange 17 on bottom plate 16 and has an outside diameter slightly less than that of flange 17 such that top plate 19 can be positioned coaxially over bottom plate 16 with casting 22 spaced slightly inward of flange 17. Of course, if desired, the plate and casting can be of one piece. Casting 22 has a center opening 23 approximately the same diameter as opening 21 and is stepped inwardly at its lower, outer edge to form an annular seat 24 sized to receive O-ring 13. Casting 22 is further provided with four vertical passages 25 which are disposed at 90° intervals about casting 22 and are positioned such that they coincide in location with tapped openings 20 in plate 19.

It will be noted that sealing ring 13, which can be made of chloroprene rubber, is positioned resting on bottom plate 16 just inside flange 17 such that seat 24 rests on it. Preferably the thickness of ring 13 is sufficient that the bottom of casting 22 slightly clears the top of bottom plate 16 and the sides of ring 13 are just tangent to the side of casting 22 below seat 24 and the inner side of flange 17.

Bottom 12 and top 11 are retained together by means of a hoop 26 positioned encircling flanges 17 and 18. Hoop 26, which has the cross-section of an inverted T, consists of a vertical, cylindrical portion having inwardly and outwardly extending, annular flanges at its lower end and is secured to the underside of the rim of plate 19 by means of a series of cap bolts 30 which extend upwardly through apertures disposed at intervals about the outer annular flange of hoop 26 with their shank ends threadedly rereceived in correspondingly positioned tapped openings in the underside of the rim of plate 19 to hold hoop 26 firmly against the underside of plate 19.

The inside diameter of the cylindrical portion of hoop 26 is sized just to clear flange 18 on bottom 12 such that the inner annular flange at the lower end of hoop 26 is spaced below and underlies flange 18 to receive a strip 31 of hard chloroprene rubber between hoop 26 and flange 17. Rubber strip 31 has cross-sectional dimensions generally filling the space between the lower inner flange on hoop 26 and flange 18.

Referring now to FIGURES 2 and 3, valve 14 includes a valve body 33, a pot-shaped piston (valve element) 34, a helical spring 35 and a spring retainer cage 36. Generally, valve body 33 includes a pair of coaxial cylindrical walls 37 and 38, which are spaced from each other at their upper ends and are closed together at their lower ends by means of an interconnecting annular end wall 39. The outer sidewall 37 at its uper end is provided with an outwardly extending annular flange 40 and itself has a diameter just less than that of openings 21 and 23 such that valve body 33 can be positioned in openings 21 and 23 with flange 40 overlying the top of plate 19. Inner wall 38 has a machined inside surface which is countersunk at its upper end and which is provided with a series of apertures 41 adjacent its lower end providing communication between the annular space between walls 37 and 38 and the central opening of valve body 33 lying inside wall 38.

Piston 34 is a machined casting sized to fit snugly but slidingly within cylindrical wall 38 and has a flange 42 at its upper end received in the counter bore in the upper end of the interior of wall 38 to limit downward movement of piston 34 at a position in which the lower, closed end of piston 34 is flush with the underside of casting 22 when piston 34 is dropped into the central opening of valve body 33 from its upper ends. Two metal piston rings 28 are arranged in grooves machined in the outer surface of piston 34 to provide for sealing of the bottom of the piston at the inner sidewall 38 of the valve body 33 and a rubber-like O-ring 29, e.g., of chloroprene, is arranged in the counter bore of the inner sidewall 38 beneath the flange 42 of piston 34 to serve as a cushion during downward movement of the piston 34.

Spring cage 36 is a short steel cylinder 43 which is threaded at its upper end and which has an outwardly projecting, annular flange 44 at its lower end and a pair of intersecting stepped cross-plates in its upper interior portion forming a spider 45. The cylindrical portion 43 of spring cage 36 has the same inside diameter as sidewall 37 of valve body 33 and is positioned above valve body 33 with annular flange 44 on spring cage 36 overlying flange 40. Spring cage 36 is retained in such position by a series of cap bolts 46 received in apertures in flanges 40 and 44 which register with correspondingly disposed tapped bores about opening 21 in plate 19 such that helical spring 35 is retained snugly under compression between the underside of spider 45 and the upperside of the closed bottom of piston 34. The spacing of the flights of spring 35 in this position and the length of piston 34 in relation to the location of spider 45 is such that when piston 34 is displaced upwardly to the maximum compression of spring 35, apertures 41 in sidewall 38 are completely exposed to communicate the space confined between bottom 12 and top 11 with the annular space between walls 37 and 38 of valve body 33 and hence with the exterior of exploder 10 through spring cage 36.

Muffler 15, which is of any conventional construction providing low-pass characteristics desirably having an upper cut-off frequency on the order of five cycles per second, is threadedly received at its open, lower end on the upper end of cylinder 43 of spring cage 36 and is provided with lateral openings 47 about its upper, closed end to permit venting of gases passing upwardly through valve 14 into muffler 15. Interiorly muffler 15 is hollow, in the illustrated case, and is centrally enlarged as indicated by the reference numeral 48. A frusto-conical deflector skirt 49 is mounted at the upper end of muffler 15 above openings 47 and extends downwardly and outwardly to below the level of openings 47. Optionally openings 47 can be disposed in several rows about the top of muffler 15 underlying deflector skirt 49, and the upper end of muffler 15 can be further provided, if desired, with external annular bafflles 50' positioned within deflector skirt 49 and spaced inwardly therefrom, each such baffle 50' being attached to muffler 15 between an adjacent pair of rows of openings 47.

It will be noted gas exploder 10, as illustrated in FIGURES 1–3, is further equipped with a shallow cylindrical tank 50 including, as integral parts, a cylindrical sidewall 51, an annuar bottom plate 52, outwardly extending, annular flanges 53 and 54 at the upper and lower ends of sidewall 51, respectively, and four upstanding sleeves 55 having their lower ends disposed in openings in plate 52 registering with openings 20 but having wider diameters than openings 20. In addition the central aperture of plate 52, which is wider than flanges 40 and 44 on valve body 33 and spring cage 36, respectively, is also provided with an integral, upstanding sleeve 56, the lower end of which is disposed in such central aperture. Tank 50 is further provided with a pair of slightly bowed braces 57 and 58 which are in juxtaposition with their adjacent end pairs close and welded to the inside of sidewall 51 and with their centers bowed away from each other with sleeve 56 between them.

Exteriorly tank 50 is provided at diametrically opposite positions in its sidewall 51 with a pair of outwardly extending stub shafts 59 which are secured to sidewall 51, each adjacent one pair of adjacent ends of braces 57 and 58. Stub shafts 59 can be used for carrying gas exploder 10 in a fork-type device. If desired, tank 50 can retain a lead casting within sidewall 51 for extra weight. In such case sleeves 55 and 56 serve to provide access to openings 20 and valve 14, respectively.

Referring to FIGURES 1 and 2, gas exploder 10 further requires a gas charging and ignition system, generally designated by the reference number 60. Charging and ignition system 60 basically includes four upstanding conduits 61 interconnected at their upper ends through a header 62 and mixing unit 70 to separate valved connections 63 and 64 leading to storage cylinders, respectively; for a suitable combustible fuel gas, e.g., propane, propylene, etc. and oxygen. If desired, additional valved connections (not shown) can be provided for connection to additional gas sources, e.g., for mixing fuel gases, if desired.

Each upstanding conduit 61 includes a pipe section 65 threadedly received at its lower end in a tapped aperture 20 in plate 19, and, threadedly received on the upper end of such pipe section 61, a four-way fitting 66. Header 62 generally includes suitable nipples, elbows and tees, as well as pipe sections, to provide a U-shaped connection communicating the upper openings of four-way fittings 66, with valved conduits 63 and 64 which are preferably connected to the bottom of the U.

Eight spark plugs 67 having their ground electrodes removed are connected, two to each four-way fitting 66, in the lateral openings of fittings 66 such that, as shown most clearly in FIGURE 2, the insulated electrodes 68 of each thusly associated pair of plugs 67 face each other in such fitting 66. Exteriorly eight spark plugs 67, thus mounted, are electrically connected in series across a suitable electrical supply 69 which is capable of impressing a high voltage, typically on the order of 70,000 volts, across serially interconnected spark plugs 67 at any desired instant in time.

In operation gas exploder 10 is located at a suitable location with the bottom 12 resting on the ground at a spot clear of large stones and other undesirable structure. Typically spring 35 is under sufficient compression such that operation of position 34 does not occur until a pressure within exploder 10 on the order 30 p.s.i.g. has been reached. Valved conduits 63 and 64 are then opened to admit fuel gas and oxygen until a pressure in exploder 10 on the order of 2 p.s.i.g. has been achieved. It will be apparent that a stoichiometric mixture of oxygen and propylene, or a slight excess of oxygen, is sought and that this can be achieved quite simply by introducing the gases such that the partial pressure of each are in proportion to the molar ratio of a stoichiometric mixture of oxygen and fuel gas, i.e. $4.5:1::O_2:C_3H_6$.

Mixing unit 70 insures complete mixing of the gases before they are introduced into the chamber formed between bottom 12 and top 11.

With valved conduits 63 and 64 closed, exploder 10 is properly charged and an explosion can be initiated simply by actuating high voltage source 69 at the desired point in time, whereupon high potential is placed across the serial connection of the eight spark plugs 67. It will be apparent that in the event of any fouling of spark plugs 67 at least two active gaps from an electrode 68 to ground or another electrode 68 are nevertheless provided such that combustion of the mixture of gases within exploder 10 is initiated, with a resultant explosion occurring substantially simultaneously with energization of plug 67.

When exploder 10 is charged the cross-section of sealing ring 13 is of substantially circular shape and the surfaces of flange 17, of plate 16 and of casting 22 are tangent to the exterior of ring 13. As the gases are exploded, however, subsequent to the initial shock wave of the explosion which creates the seismic wave of interest, the continued expansion of the exploding gases drives the weight of top 11 and its associated equipment upwardly relative to bottom 12 tending to compress resilient strip 31, which can so yield, although in a limited manner. At such time the pressure of the exploding gases forces sealing ring 13 tightly against the joint formed between the flange 17 and casting 22, generally deforming ring 13 against such joint and, at the same time, lifting ring 13 with the rising structure supported on and by plate 19.

At the same time as relative movement of the bottom 12 and top 11 occurs, piston 34 is lifted at even faster rate to rapidly vent the interior of gas exploder 10 through valve 14 and muffler 15. This venting action is so rapid that normally the pressure is relieved and top 11 again collapses on bottom 12 within a fraction of a second. Generally after such collapse, which collapse is cushioned by sealing ring 13, the pressure of unvented combustion gases remaining between top 11 and bottom 12 is substantially negative to atmospheric, being on the order of five p.s.i.a., and as a result, is usually unnecessary in subsequent firing to purge the interior of gas exploder 10 when recharging, accordingly, recharging may be accomplished so fast that repetitive firing at significantly rapid rates, e.g. on the order of 5 per second, is feasible.

To illustrate the effectiveness of my method and device for initiating seismic waves, clear records have been obtained with explosive charges including stoichiometric amounts of oxygen and respectively, propane, methane and propylene; with explosive charges containing oxygen in an amount sufficient to provide one-half mol oxygen above the stoichiometrically required amount and respectively propane and propylene; and with explosive charges containing oxygen and propane above the stoichiometrically required amount.

I claim:

1. In a device for propagating a seismic wave at the surface of the earth by the explosion of a combustible mixture in a chamber having a rigid bottom and a rigid top resiliently fastened together to permit limited vertical movement of said top relative to said bottom, the improvement of means within said top for rapidly venting said chamber substantially simultaneously with the occurrence of relative movement between said bottom and said top to relieve the pressure within said chamber.

2. The improvement of claim 1, wherein said venting means includes a spring-biased sliding exhaust valve.

3. The improvement of claim 2 wherein said device for propagating a seismic wave includes an opening in the rigid chamber top connecting said chamber to the atmosphere and wherein said exhaust valve includes a valve body positioned in said opening and including an outer sidewall and a spaced apart inner sidewall defining a second opening, said inner and outer sidewalls being rigidly joined together and sealed at their lower ends, said inner sidewall having multiple apertures, therein interconnecting said second opening and the annulus formed between said inner and outer sidewalls, a valve element slidably arranged in said second opening and adapted to valve said apertures, and spring means above said valve element for normally biasing said valve element to close said apertures, whereby upon the occurrence of an explosion in said chamber the pressure of the gases produced in the chamber raises the valve element against the bias of said spring means and the gases are exhausted from the chamber through said apertures and the annulus formed between said inner and outer sidewalls.

4. A device according to claim 3 wherein said valve element is a pot-shaped piston and wherein said spring means comprises a spring arranged within said pot-shaped piston and stationary means for retaining the spring, said last-mentioned means comprising a cylinder secured to said valve body and spider means arranged in said cylinder, said spring acting against said spider means to normally bias said piston to close said aperture.

5. A device according to claim 4 wherein said piston includes at least one piston ring arranged in its outer surface and adapted to seal said piston with respect to said inner sidewall.

6. A device according to claim 4 wherein said inner sidewall includes a counterbore adjacent the outer end thereof and said piston includes a flange resting on said counterbore when said piston is biased by said spring.

7. A device according to claim 6 further including a resilient cushioning means arranged between said flange and said counterbore.

References Cited

UNITED STATES PATENTS

| | | | |
|---|---|---|---|
| 488,309 | 12/1892 | Coale | 137—469 X |
| 2,882,922 | 4/1959 | Schindel | 102—25 X |
| 3,189,040 | 6/1965 | Johnson | 137—469 |
| 3,260,327 | 7/1966 | McCollum | 181—.5 |
| 3,314,497 | 4/1967 | Kilmer | 181—.5 |
| 3,198,282 | 8/1965 | Dunaway | 181—.5 |

BENJAMIN A. BORCHELT, *Primary Examiner.*

G. H. GLANZMAN, *Assistant Examiner.*